(12) United States Patent
Boivie (10) Patent No.: US 11,520,913 B2
(45) Date of Patent: Dec. 6, 2022

(54) SECURE EXECUTION SUPPORT FOR A.I. SYSTEMS (AND OTHER HETEROGENEOUS SYSTEMS)

(71) Applicant: International Business Machines Corporation, Armonk, NY (US)

(72) Inventor: Richard H. Boivie, Monroe, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 174 days.

(21) Appl. No.: 15/977,429

(22) Filed: May 11, 2018

(65) Prior Publication Data

US 2019/0347432 A1    Nov. 14, 2019

(51) Int. Cl.
| | |
|---|---|
| *G06F 21/62* | (2013.01) |
| *G06F 9/54* | (2006.01) |
| *G06F 21/60* | (2013.01) |
| *G06F 21/72* | (2013.01) |
| *G06N 20/00* | (2019.01) |

(52) U.S. Cl.
CPC ............ *G06F 21/6209* (2013.01); *G06F 9/54* (2013.01); *G06F 21/602* (2013.01); *G06F 21/72* (2013.01); *G06N 20/00* (2019.01)

(58) Field of Classification Search
CPC .... G06F 21/6209; G06F 21/602; G06F 21/72; G06F 9/54; G06F 21/12; G06F 21/70; G06F 21/10; G06F 21/56; G06N 20/00
See application file for complete search history.

(56) References Cited

U.S. PATENT DOCUMENTS

2006/0130128 A1\*   6/2006   Gorancic ............... G06F 21/77
                                                    726/9
2007/0226807 A1   9/2007   Ginter et al.
(Continued)

FOREIGN PATENT DOCUMENTS

| CN | 100580682 C | 1/2010 |
| CN | 102428473 A | 4/2012 |

OTHER PUBLICATIONS

Hategekimana et al., "Secure Hardware Kernels Execution in CPU+FPGA Heterogeneous Cloud," 2018 International Conference on Field-Programmable Technology (FPT) Year: 2018 | Conference Paper | Publisher: IEEE.\*

(Continued)

*Primary Examiner* — Roderick Tolentino
(74) *Attorney, Agent, or Firm* — Jeffrey S. LaBaw, Esq.; McGinn I.P. Law Group, PLLC.

(57) ABSTRACT

A method for securing Secure Objects that are protected from other software on a heterogeneous data processing system including a plurality of different types of processors wherein different portions of a Secure Object may run on different types of processors. A Secure Object may begin execution on a first processor then, depending on application requirements, the Secure Object may make a call to a second processor passing information to the second processor using a special inter-processor function call. The second processor performs the requested processing and then performs an inter-processor "function return" returning information as appropriate to the Secure Object on the first processor.

20 Claims, 9 Drawing Sheets

(56) References Cited

U.S. PATENT DOCUMENTS

| | | | | |
|---|---|---|---|---|
| 2008/0295120 | A1* | 11/2008 | Suzuki | G06F 9/547 |
| | | | | 719/330 |
| 2013/0067240 | A1* | 3/2013 | Tamasi | G06F 21/602 |
| | | | | 713/189 |
| 2014/0053278 | A1* | 2/2014 | Dellow | G06F 21/60 |
| | | | | 726/27 |
| 2014/0304505 | A1 | 10/2014 | Dawson | |
| 2016/0041909 | A1* | 2/2016 | Gu | G06F 12/0835 |
| | | | | 711/121 |
| 2016/0162171 | A1* | 6/2016 | Yi | G06F 40/143 |
| | | | | 715/211 |
| 2016/0301759 | A1* | 10/2016 | Xue | H04L 67/146 |
| 2016/0378693 | A1* | 12/2016 | Sasaki | G06F 21/74 |
| | | | | 711/152 |
| 2017/0286701 | A1* | 10/2017 | Kim | G06F 9/545 |
| 2017/0318008 | A1 | 11/2017 | Mead | |
| 2018/0373849 | A1* | 12/2018 | Gidley | G06F 21/54 |

OTHER PUBLICATIONS

Fan et al., "One Secure Access Scheme Based on Trusted Execution Environment," 2018 17th IEEE International Conference On Trust, Security And Privacy In Computing And Communications/ 12th IEEE International Conference On Big Data Science And Engineering (TrustCom/BigDataSE) Year: 2018 | Conference Paper | Publish.*

Chinese Office Action, dated Sep. 1, 2022, in Chinese Application No. 201910387553.X.

* cited by examiner

```
Secure Class Password_table {
    <private data structures>
    <private methods>

// public methods: publically accessible, but implementations are private
    public boolean validatePassword(loginid, password){
        <private code>
    } public Boolean changePassword(loginid, oldpassword, newpassword)
        <more private code>
    }
}
```

SECURE EXECUTION SUPPORT FOR A.I. SYSTEMS (AND OTHER HETEROGENEOUS SYSTEMS)

CROSS REFERENCE TO RELATED APPLICATIONS

The present application is related to, makes reference to the following patent applications all of which are incorporated herein by reference: U.S. patent application Ser. No. 12/492,738, filed on Jun. 26, 2009, to Richard H. Boivie, entitled "Support for Secure Objects in a Computer System", now issued as U.S. Pat. No. 8,819,446; U.S. patent application Ser. No. 12/878,696, filed on Sep. 9, 2010, to Richard H. Boivie, entitled "Cache Structure for a Computer System Providing Support for Secure Objects", now issued as U.S. Pat. No. 9,298,894; U.S. patent application Ser. No. 13/033,367, filed on Feb. 23, 2011, to Boivie and Williams, entitled "Secure Object Having Protected Region, Integrity Tree and Unprotected Region", now issued as U.S. Pat. No. 8,578,175; U.S. patent application Ser. No. 13/033,455, filed on Feb. 23, 2011, to Boivie and Williams, entitled "Building and Distributing Secure Object Software", now issued as U.S. Pat. No. 8,954,752; U.S. patent application Ser. No. 13/226,079, filed on Sep. 6, 2011, to Boivie and Pendarakis, entitled "Protecting Application Programs from Malicious Software or Malware", now issued as U.S. Pat. No. 9,846,789; and U.S. patent application Ser. No. 14/839,691, filed on Aug. 28, 2015, to Boivie et al, entitled "System and Method for Supporting Secure Objects Using a Memory Access Control Monitor".

BACKGROUND OF THE INVENTION

Field of the Invention

The disclosed invention relates generally to an embodiment of secure execution support, and more particularly, but not by way of limitation, relating to a use of secure execution support for Artificial Intelligence (AI) systems and other heterogeneous systems.

Description of the Related Art

In recent years computers systems have been increasingly under attack by various forms of hacking and malware. To address this, the concept of a 'Secure Object' was introduced comprising code and data that is cryptographically protected from the other software on a computer system including any malware that an attacker may be able to introduce into a targeted computer system. Secure Objects and computer architectures for supporting these Secure Objects have been discussed previously in the patent applications incorporated herein by reference.

In the last few years computer systems have become more heterogeneous incorporating in addition to traditional CPUs (Central Processing Units), other kinds of special processors such as GPUs (Graphical Processing Units) and special-purpose processing units for Artificial Intelligence applications such as ANNs (Artificial Neural Networks) and TPUs (Google Tensor Processing Units).

As systems become more heterogeneous, there is a need to protect the security of applications that run on these heterogeneous systems.

SUMMARY OF INVENTION

In view of the foregoing and other problems, disadvantages, and drawbacks of the aforementioned background art, an exemplary aspect of the disclosed invention provides secure execution support for Artificial Intelligence (AI) systems and other heterogeneous systems.

One aspect of the present invention is to provide support for Secure Objects that are protected from other software on a heterogeneous data processing system comprising a plurality of different types of processors wherein different portions of a Secure Object may run on different types of processors. A Secure Object may begin execution on a first processor then, depending on application requirements, the Secure Object may make a call to a second processor passing information to the second processor using a special inter-processor function call. The second processor performs the requested processing and then performs an inter-processor "function return", returning "return values" as appropriate to the Secure Object on the first processor. The processing on the second processor can be considered an "extension" of the Secure Object on the first processor.

Another aspect of the present invention provides a method for securing a data processing system including providing a Secure Object comprising code and data that is protected from the other software on the data processing system on a first processor which is a first type of processor, wherein the data processing system has a plurality of processors of different types, beginning execution of the Secure Object on the first processor, responsive to a portion of the Secure Object being needed to be executed on a second processor which is a second type of processor, by the first processor calling the second processor in a special call, returning by the second processor to the first processor a new value for an integrity root of the Secure Object, and retrieving, by the first processor, encrypted information from system memory using a crypto key and the integrity root.

Another example aspect of the disclosed invention is to provide a computer readable medium storing a method for securing Secure Objects on a heterogeneous data processing system comprising a plurality of different types of processors wherein different portions of a Secure Object may run on different types of processors wherein a Secure Object may begin execution on a first processor then, depending on application requirements, the Secure Object may make a call to a second processor passing information to the second processor via a special inter-processor function call. The second processor performs the requested processing and then performs an inter-processor "function return", returning "return values" as appropriate to the Secure Object on the first processor.

Another example aspect of the disclosed invention is to provide a computer readable medium storing a method for securing a data processing system including providing a Secure Object comprising code and data that is protected from the other software on the data processing system on a first processor which is a first type of processor, wherein the data processing system has a plurality of processors of different types, beginning execution of the Secure Object on the first processor, responsive to a portion of the Secure Object being needed to be executed on a second processor which is a second type of processor, by the first processor calling the second processor in a special call, returning by the second processor to the first processor a new value for an integrity root of the Secure Object, and retrieving, by the first processor, encrypted information from system memory using a crypto key and the integrity root.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF DRAWINGS

The exemplary aspects of the invention will be better understood from the following detailed description of the exemplary embodiments of the invention with reference to the drawings.

DETAILED DESCRIPTION OF PREFERRED EMBODIMENTS

The invention will now be described with reference to the drawing figures, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

There is the concept of a Secure Object comprising code and data that is protected from the other software on a system. The Secure Object, like objects in other object-oriented programming languages, contains data and code that manipulates and provides access to that data. A Secure Object differs from objects in existing programming languages such as Java, in that the Secure Object's private code and data are cryptographically protected so that no other software can access the Secure Object's private information.

Figure 1:
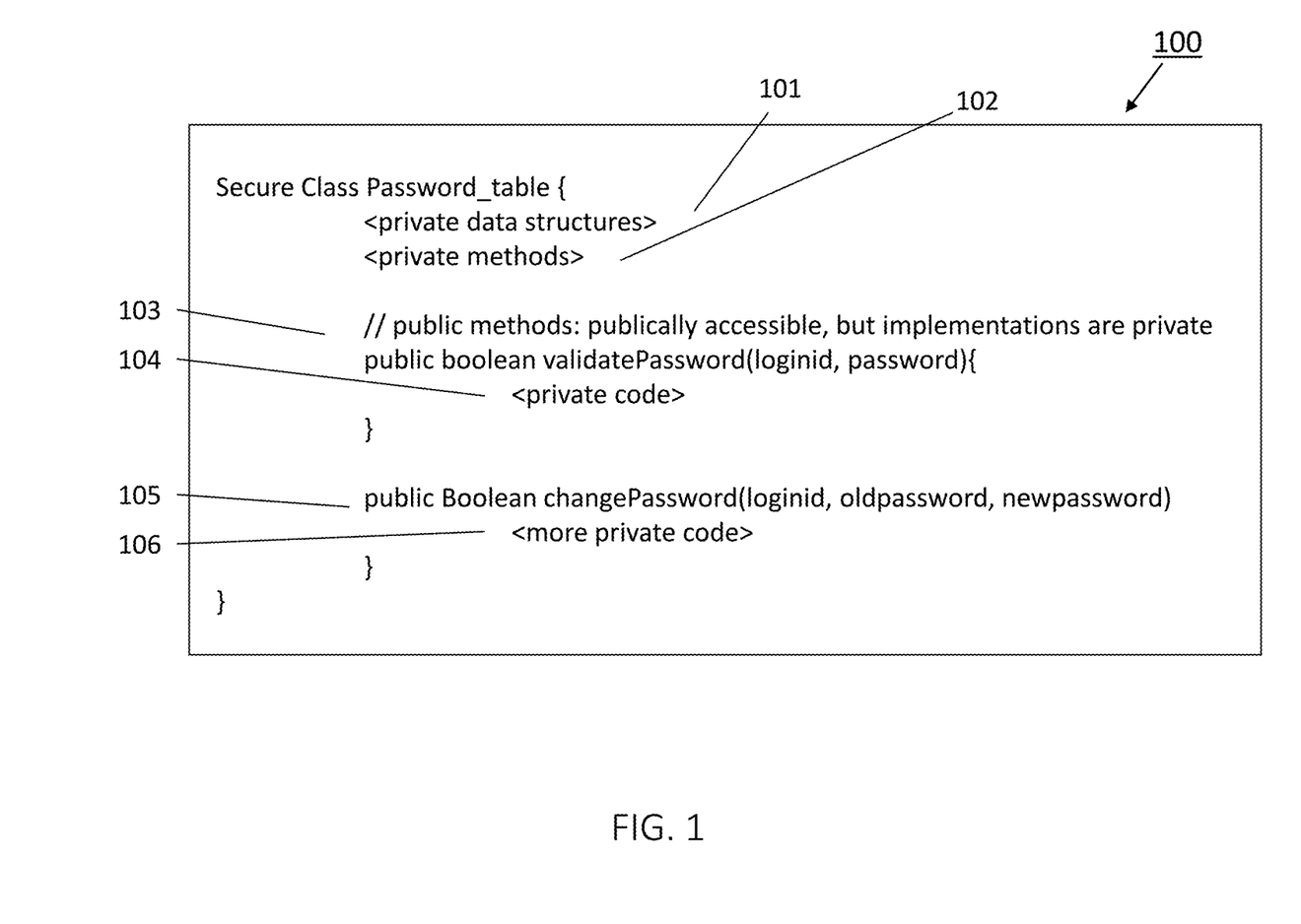
FIG. 1 illustrates a high-level language description of a Secure Object 100 that includes code and data that is cryptographically protected from other software.

FIG. 1 provides an example of what a Secure Object 100 might look like in a high-level programming language. This Secure Object includes private data 101 and private methods 102, as well as methods that allow access to the Secure Object through its public interfaces 103, 105. Secure Objects can be used by other software (that is, other software can "call" or "send messages" to a Secure Object) but other software can only access a Secure Object through its public interfaces 103, 105.

In one embodiment of a Secure Object based system, private information is almost always encrypted. It is encrypted while it is in memory and while it is on disk, whether it is in a paging system or in a file system.

Figure 2:
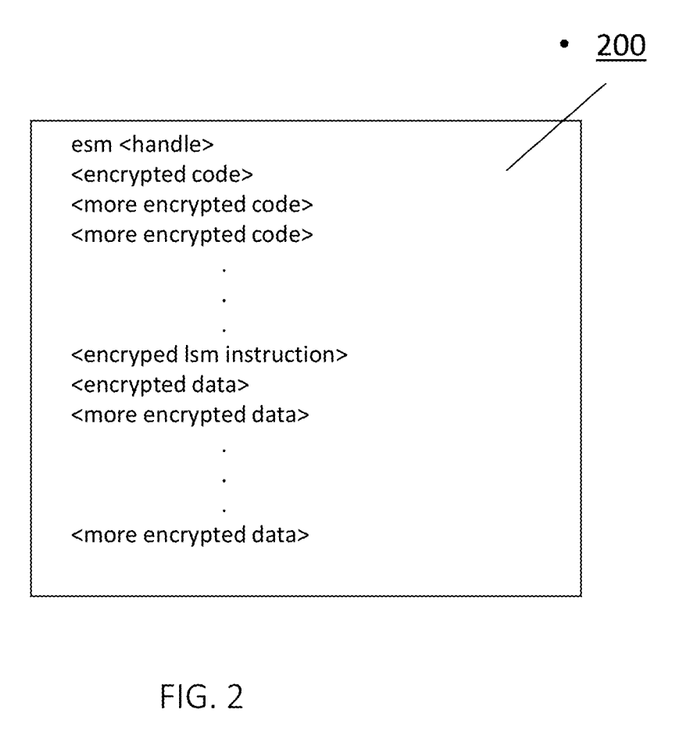
FIG. 2 is an illustration of a low-level implementation 200 (e.g., the compiled version) of a Secure Object.

FIG. 2 shows how the compiled version 200 of a Secure Object might appear in memory. A Secure Object's private information is "in the clear" only when: It is accessed from inside the Secure Object; and only while that information is inside the microprocessor.

Since no other code has access to a Secure Object's private information, a software attack that gets into a system through a vulnerability in another software module has no means of accessing the unencrypted version of the Secure Object's private information. As demonstrated in FIG. 2, the private information that is encrypted can include private code as well as private data corresponding to the private code 102 and private data 101 in FIG. 1.

For example, a design can include two new instructions that are used to enter and leave a method of a Secure Object, "esm" and "lsm", for "enter secure method" and "leave secure method", respectively.

The "esm" instruction loads crypto key information into special registers that are used to decrypt a Secure Object's private code and data as the code and data move from memory into the microprocessor. Other data such as the arguments passed to the method and the return address that was saved when the Secure Object was called are accessed without this decryption.

Figure 3:
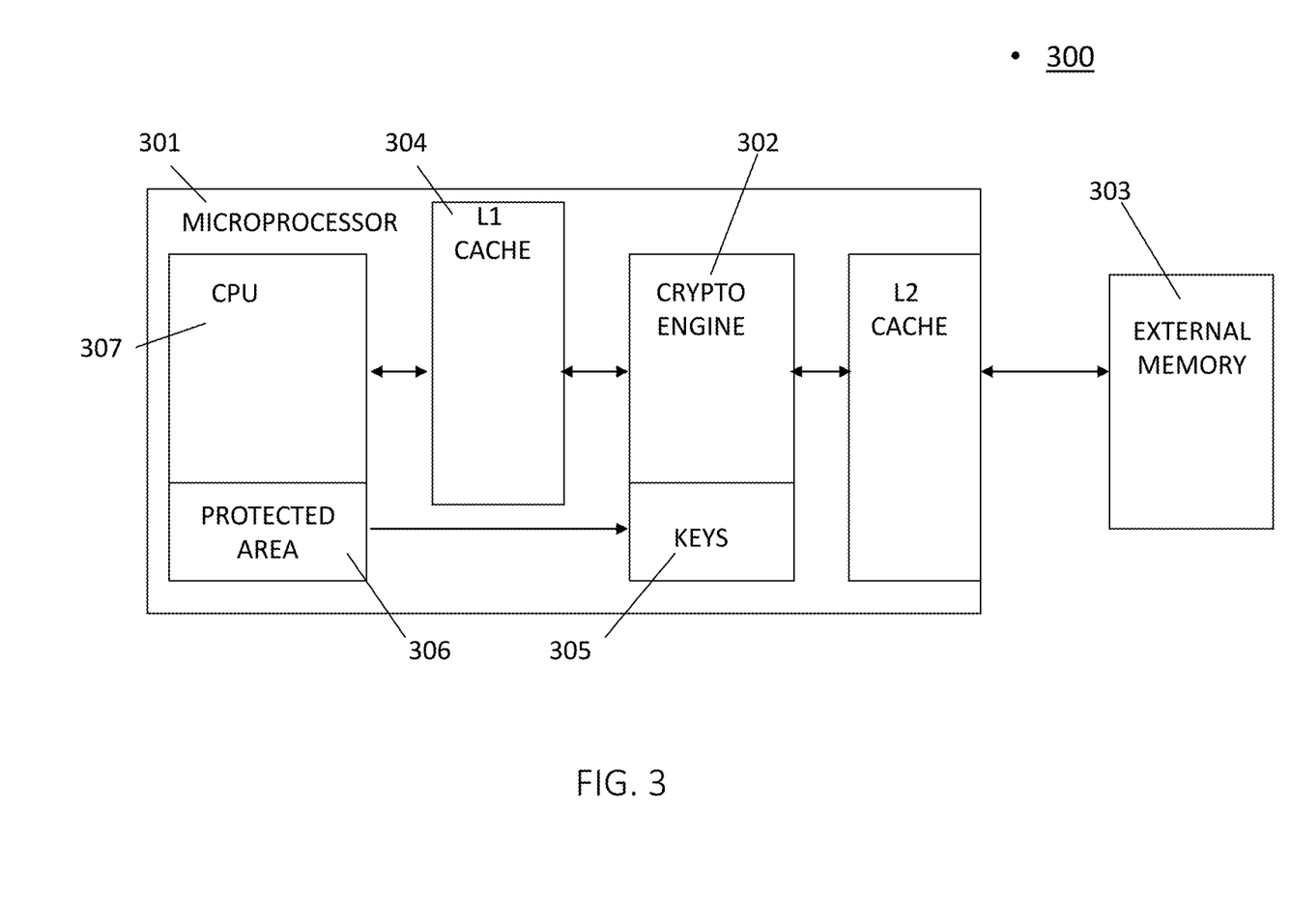
FIG. 3 shows an example block diagram 300 of a microprocessor that provides support for Secure Objects.

FIG. 3 is a block diagram 300 of a microprocessor 301 that provides support for Secure Objects. This microprocessor executes code much like microprocessors in common use today but includes a crypto-engine 302 for (1) decrypting sensitive information as that information moves from external memory 303 into the L1 cache 304 and (2) encrypting sensitive information as it moves from the L1 cache 304 to external memory 303. This cryptography is used to ensure that other software including viruses, worms and other "attack software" will not be able to access the unencrypted version of sensitive information.

FIG. 3 also shows a block 305 labeled "keys" within the crypto engine that holds the keys that are used in the encryption and decryption processes. The keys block might include a set of crypto registers specifically designated for holding these keys. It is noted that the crypto engine 302 could be a coprocessor associated with the processor 307, or the crypto engine could be a function executed by the CPU processor itself.

The "lsm" instruction, which can simply consist of an opcode, restores the previous state of the special crypto registers 305, so that ordinary non-secure code can execute without this encryption and decryption when the secure method returns.

In the Secure Object system, the keys 305 that are used to decrypt a Secure Object's private information are available to the Secure Object but these keys are not available to any other code.

Turning now to example embodiments, Secure Objects can be used to protect the confidentiality and integrity of applications or sensitive portions of applications. Secure Objects can also be used to protect software containers such as Docker containers and to protect virtual machines on a system that supports the concurrent execution of multiple virtual machines.

As systems become more heterogeneous, incorporating in addition to CPUs other kinds of processors such as GPUs (Graphical Processing Units), ANNs (artificial neural networks), FPGAs (Field Programmable Gate Arrays), TPUs (Tensor Processing Units), IBM Q (Quantum) processors etc., there is a need to protect the confidentiality and integrity of applications that run on heterogeneous systems.

As discussed in the previous patent applications incorporated herein by reference, a CPU-based system can protect the confidentiality and integrity of a Secure Object from the other software on the system with cryptography and an integrity tree if the crypto key and the root of the integrity tree are protected from the other software. The crypto key and the integrity tree can be managed by hardware or by a combination of hardware and firmware. For example, the hardware and firmware can be in, or run in, the CPU.

However, in a heterogeneous system, other kinds of processors will need to be able to access the unencrypted form of a Secure Object's information and may need to access the Secure Object's crypto key and integrity root—while protecting that information from other software.

Figure 4:
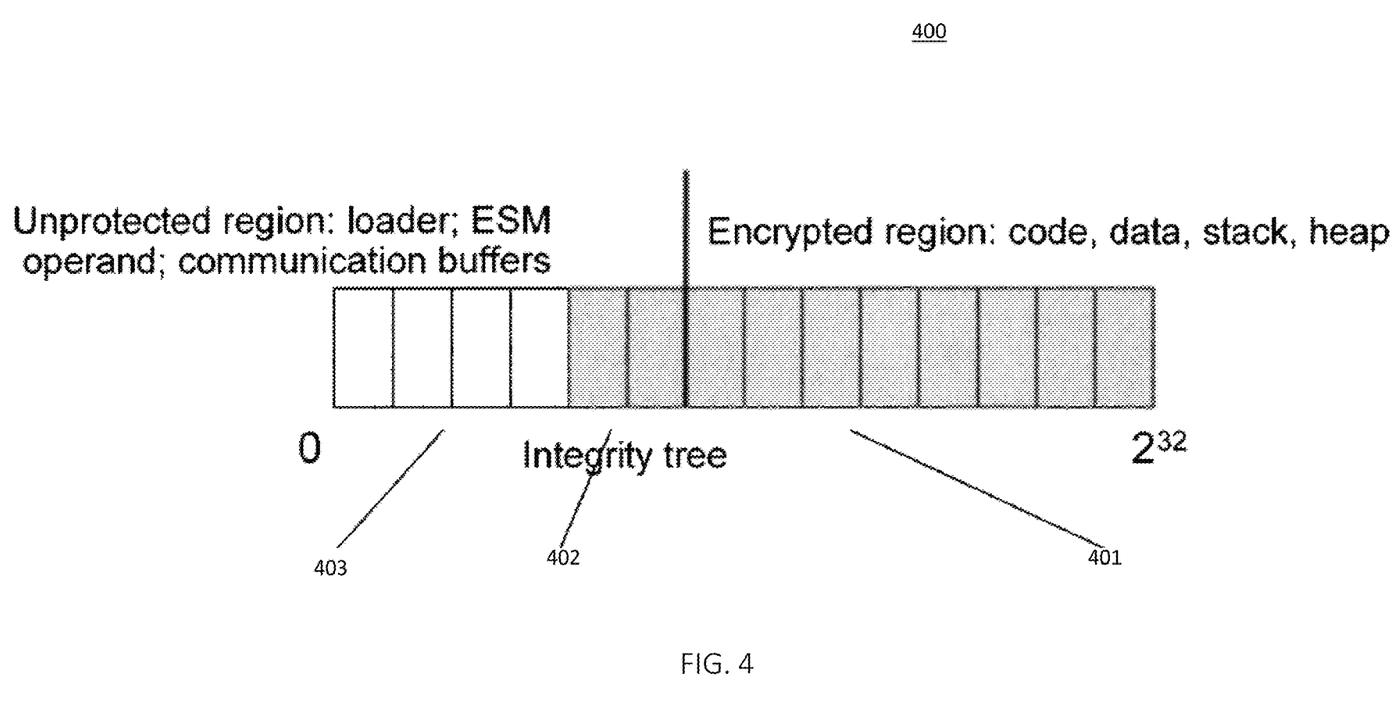
FIG. 4 illustrates an example format of an executable file 400 that includes Secure Object-based software.

FIG. 4 illustrates an exemplary format of an executable file 400 that includes Secure Object-based software. The file contains (1) the Secure Object code and data in encrypted form 401, (2) the initial version of an integrity tree 402 that will be used at run-time to protect the integrity of the Secure Object's code and data, and (3) loader code including an "esm" instruction (in 403) to 'Enter Secure Mode'. The "esm" instruction allows a Secure Object's sensitive information to be decrypted on the path from external memory into the CPU and encrypted on the path from CPU to external memory.

FIG. 4 also shows communication buffers in the unprotected region 403. These will be discussed in more detail below. Thus, in FIG. 4, the unshaded region 403 of the binary file is an unprotected region that includes a loader, the "esm" instruction including the "esm" operand (or handle), and communication buffers. The shaded regions include the integrity tree 402 and the encrypted region 401 that includes one or more of code, data, stack, and heap data. This file might be in a standard executable format, such as ELF. The code and data are encrypted so that only the target CPU can read the encrypted region and only in secure mode.

The binary file for the secure object contains the encrypted code and data 401 of the secure object, the initial integrity tree 402, and the unprotected region 403 including communication buffers, the loader code and the "esm" instruction that will be used to enter secure mode at run-time.

Figure 5:
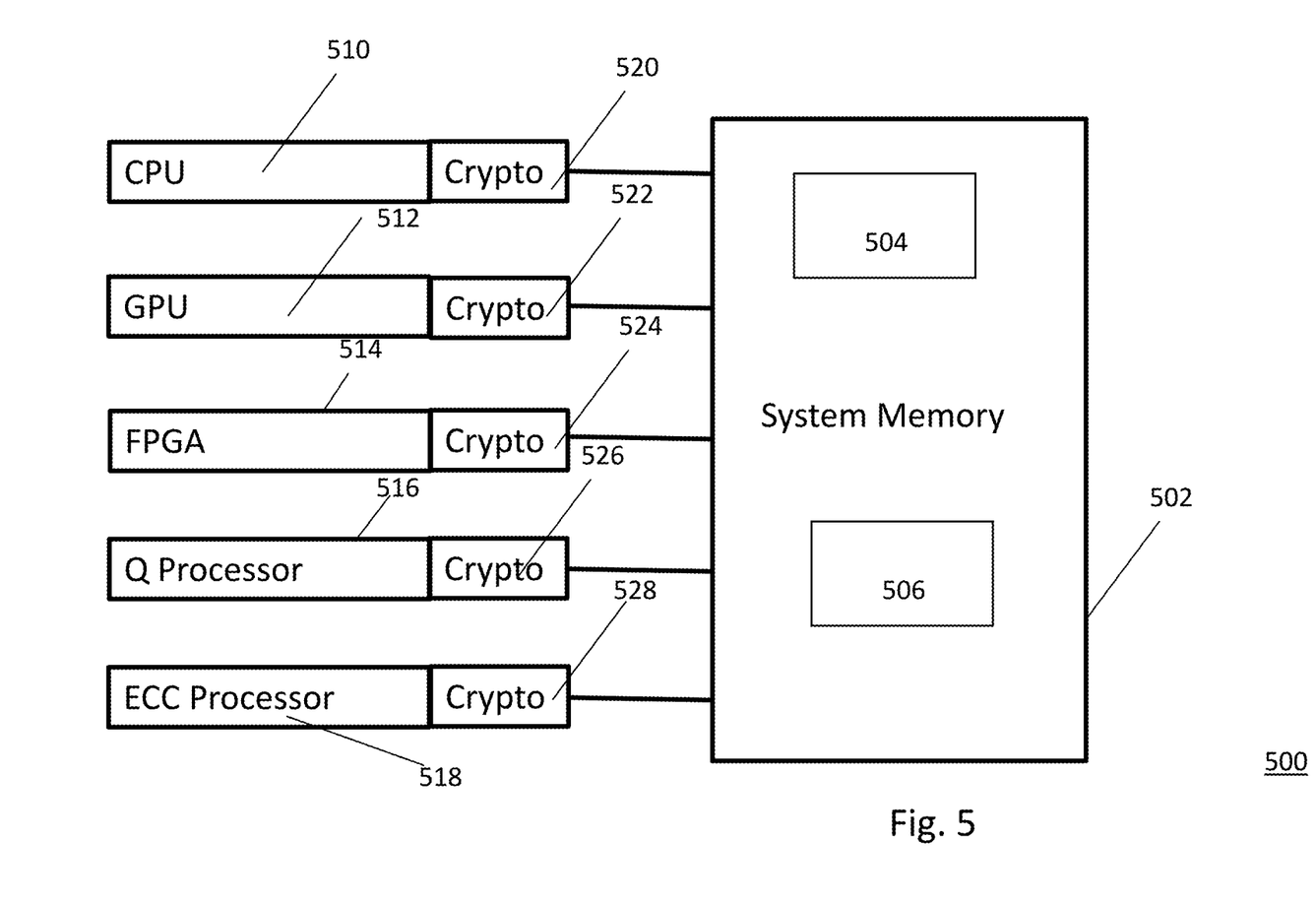
FIG. 5 illustrates a system 500 of a first example embodiment.

In a first example embodiment of the current invention, shown in FIG. 5, a system 500 will consist of a system memory 502 that is accessible by various kinds of processors, such as one or more CPUs (central processing units) 510, GPUs (Graphical Processing Units) 512, ANNs (artificial neural networks), FPGAs (Field Programmable Gate Arrays) 514, TPUs (Tensor Processing Units), IBM Q (Quantum) processors or other Quantum processors 516, ECC (Elliptic Curve Cryptography) processors 518 etc. A Secure Object's private information will be cryptographically protected while it is in this system memory 502 and this information will only be available in unencrypted form to a processor that has the Secure Object's crypto key. Moreover, this private information will only be writable in a way that does not later cause an integrity exception, by a processor that has both the Secure Object's crypto key and the root of its integrity tree.

System memory 502 may also include "unprotected memory" 504 which a Secure Object can use for communications buffers to communicate with other entities. Information in this unprotected memory 504 is not protected by the Secure Object protection mechanisms although a Secure Object will normally protect information that it puts in this area of unprotected memory 504 by other means such as SSL/TLS (Security Socket Layer/Transport Security Layer), IPsec (Internet Protocol Security) or dm-crypt (a transparent disk encryption subsystem) as discussed in the previous patent applications.

In this example embodiment, a Secure Object will begin execution on a CPU (Central Processing Unit) 510. When some portion of the processing is to be done on a special processor such as a GPU (Graphic Processing Unit) 512 or a TPU (Tensor Processing Unit), for example, the CPU 510 will "call" the special processor 512 to 518 via a "hardware subroutine call". This "call" will include an indication of the processor that is being called, an indication of the specific function that is being called, the address(es) in system memory of the data to be processed and the address(es) in system memory 502 where return values can be stored. The "call" will also securely pass the Secure Object's crypto key and integrity root to the special processor so that the special processor can access and update the Secure Object's cryptographically-protected information in system memory 510. In this embodiment, the special processors, such as a GPU (Graphics Processing Unit) 512, FPGA (Field-programmable gate array) 514, Q Processor (Quantum Processor) 516, and ECC (Elliptic Curve Cryptography) Processor 518, include crypto engines 520, 522, 524, 526, and 528, respectively, that decrypt information and check integrity when reading from system memory 502 and encrypt information and update integrity values when writing system memory 502 as discussed in the previous applications. When the special processor 512 to 518 completes the requested processing, it will "return" to the CPU 510 any return values as well as a new value for the root of the Secure Object's integrity tree. At this point, the Secure Object can resume execution on the CPU 510 and access and update its cryptographically-protected information in system memory 502, including any information that was written by the special processor (512 to 518) and the CPU 510 will be able to do this without getting an integrity exception.

The CPU 510 will also be able to "call" other special processors 512 to 518 as necessary. The "calls" and "returns" can be implemented as inter-processor interrupts. The information passed to or returned from a "hardware subroutine call" can be passed in cryptographically-protected system memory 506 and the crypto key and the root of the integrity tree can be securely passed via a standard communications security mechanism like TLS (Transport Layer Security) under a key negotiated between the CPU and the special processor at system boot. The TLS packets can be transferred via an inter-processor communications mechanism like PCIe (Peripheral Component Interconnect Express) or through "unprotected" system memory 504.

Of course, this example embodiment is not limited to special 'Artificial Intelligence' processors. It can also support other kinds of special processors. The design can include an ECC (Elliptic Curve Cryptography) processor, as shown in FIG. 5 or an RSA (Rivest Shamir Adleman) processor for generating and validating digital signatures.

Figure 6:
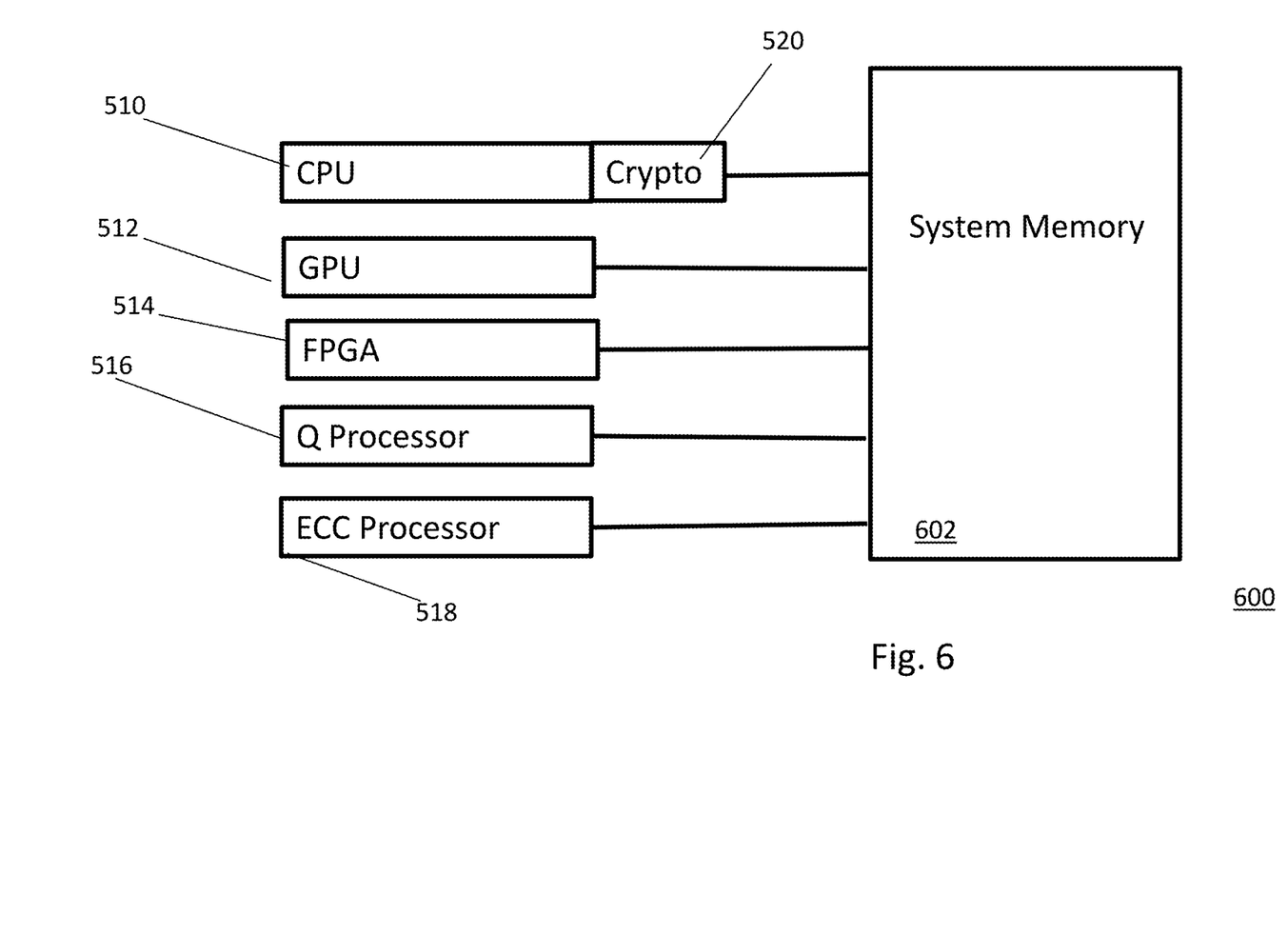
FIG. 6 illustrates a system 600 of a second example embodiment.

In a second example embodiment, shown in FIG. 6, a Secure Object's sensitive information is unencrypted in system memory 602 but access control mechanisms are used to control access to this memory 602 as discussed in U.S. patent application Ser. No. 14/839,691. In this second example embodiment, a memory page is labeled with the ID of the Secure Object that owns the page and when a Secure Object "calls" a special processor 512 to 518, the Secure Object's ID is securely passed to the special processor 512 to 518. This Secure Object ID allows the special processor 512 to 518 to access the Secure Object's memory and since the memory is unencrypted, the special processor 512 to 518 can read and write the Secure Object's protected information in system memory 602 without having to decrypt or encrypt that information and without having to check or generate integrity values. When protected information is accessed by a special processor 512 to 518, or by a CPU thread of the CPU 510, that does not have the appropriate Secure Object ID, a CPU 510 exception will occur which will allow firmware on the CPU 510 to intervene and handle the exception. For example, if a disk driver or disk firmware attempts to read a protected memory page to page it out to disk, say, firmware on the CPU 510 can catch the exception and encrypt the page before allowing the disk driver or disk firmware to read the page to page it out.

The example embodiments described above are sufficient if special processors (such as 512 to 518) contain only trustworthy hardware and firmware. However, if applications can load their own software into a special processor 512 to 518, additional mechanisms are needed to make sure that this potentially malicious software cannot compromise the private information of other secure applications. For example, when one Secure Object on a special processor 512 to 518 acquires the information needed to access a secure Object's private information in system memory such as the crypto key and integrity root in the first example embodiment or the Secure Object's ID in the second example embodiment, this information, which will be called, in the remainder of this patent application the "access key" for accessing a Secure Object's private information, should not be available to other software that may run on the special processor.

When a Secure Object on a CPU 510 makes a "call" to a special processor 512 to 518, the "access key" that is needed to access the Secure Object's private information in system memory 502 or 602 can be securely passed from trusted firmware on the CPU 510 to trusted firmware on the special processor 512 to 518. The trusted firmware on the special processor 512 to 518 can use this information to make the data in system memory 502 or 602 that is to be processed available to the "called" function. The firmware can do this for example by getting the information from system memory 502 or 602 and passing it on to the "called" function, or by configuring access control hardware or crypto hardware on the special processor 512 to 518 so that the "called" function can access the Secure Object information in system memory 502 or 602 directly.

However, the trusted firmware will not give the "access key" to any untrusted software. Moreover, when the "called" function on a special processor 512 to 518 "returns" to the CPU 510, the trusted firmware can clear any registers and any memory on the special processor that was used by the "called" function to remove any traces of the Secure Object's private information to protect that information from any untrusted software that may subsequently run on the special processor 512 to 518. Prior to the "return" to the CPU 510, the trusted firmware can also delete the "access key" on the special processor 512 to 518.

If a special processor 512 to 518 can process multiple requests concurrently, the special processor 512 to 518 should also have a means of protecting/isolating the data and processing of one "call" from that of other "calls". This can be done via standard memory management mechanisms for example or via the Secure Object mechanisms discussed in previous applications.

A Secure Object can limit the amount of private information that it exposes to a special processor 512 to 518 by passing length information along with the address(es) of arguments. Trusted firmware on the special processor 512 to 518 can make sure that the function "called" on the special processor 512 to 518 only sees the data that it's supposed to see. In the second example embodiment above, the firmware can do this by appropriately configuring access control mechanisms on the special processor 512 to 518. In the first example embodiment above, the trusted firmware can decrypt the appropriate block or blocks in system memory and then pass on to the called function just those bytes that were specified in the "call".

The trusted firmware on a special processor 512 to 518 can be "built-in", e.g. in a ROM (Read-Only Memory) on the special processor 512 to 518. Alternatively, a TPM (Trusted Platform Module defined by the Trusted Computing Group) can be used to securely boot the Special Processor 512 to 518 with trusted firmware via techniques that are well known in the industry. The Secure Boot process guarantees that appropriate firmware and data are loaded into the Special Processor 512 to 518. The data that is loaded can include public keys and/or digital certificates that the Secure Processor can use to authenticate other entities such as the CPU 510 in a heterogeneous system 500 or 600. Since the TPM can also "seal" secrets to a trusted state, the Secure Boot process can also provide the Secure Processor with secrets, such as a private key that the Secure Processor can use to prove its identity to other entities such as the CPU 510. The public keys or digital certificates and the private key can be used to establish a secure channel that the CPU 510 and the Special Processor 512 to 518 can use at run-time to securely communicate sensitive information such as the encryption keys, integrity roots and Secure Object IDs discussed above.

Other kinds of information can also be loaded into a Special Processor 512 to 518 such as the microcode that might be used for computing digital signatures on a special-purpose RSA (Rivest Shamir Adleman) public key crypto engine, the programming for an FPGA, or the connectivity, weights and thresholds of an ANN (artificial neural network) model etc.

This "functionality" can be loaded into a Special Processor 512 to 518 at system boot using standard techniques such as the 'Trusted Boot' or 'Secure Boot' procedures defined by the Trusted Computing Group. Functionality can also be loaded at run-time via a "call" from a Secure Object or from an ordinary application on the CPU 510. In this case the "call" would specify the address(es) and length(s) of information in system memory that should be loaded into the Special Processor 512 to 518 and firmware on the Special Processor 512 to 518 would then load this information into the Special Processor 512 to 518. Subsequent calls from the Secure Object or ordinary application could then make use of the functionality loaded into the Special Processor 512 to 518 to process other data. This allows a Secure Object to load and use sensitive functionality on a special processor, such as sensitive ANN models, as well as sensitive data, while protecting both the functionality and the data from other software.

Figure 7:
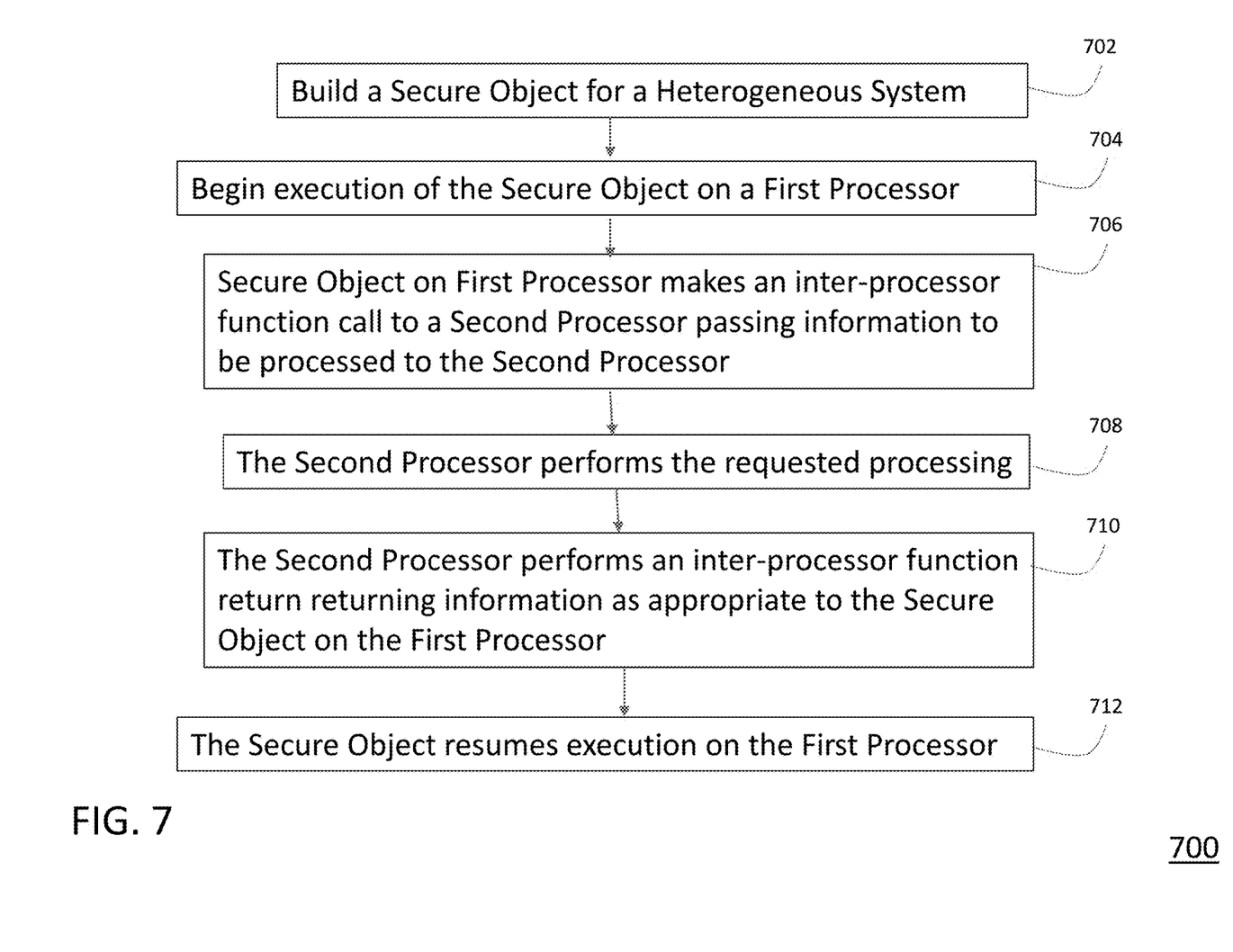
FIG. 7 illustrates an example method of the systems 500 and 600.

FIG. 7 illustrates an example method of the system 500 and 600 (with reference to FIGS. 5 and 6). A method for securing a Secure Object on a heterogeneous data processing system 500 or 600 comprising a plurality of different types of processors wherein different portions of a Secure Object may run on different types of processors includes: Building a Secure Object for a Heterogeneous System (in step 702), Beginning execution of the Secure Object on a first processor such as CPU 510 (step 704) then, depending on application requirements, the Secure Object may make an inter-processor function call to a second processor (e.g. specialized processor 512-518) passing information to be processed to the second processor via the inter-processor function call (step 706).

Then the second processor performs the requested processing (step 708) and performs an inter-processor function return, returning information as appropriate to the Secure Object on the first processor (step 710). The Secure Object then resumes execution on the first processor (step 712).

The special call can include an indication of the second processor (specialized processor 512 to 518) that is being called, an indication of the specific function that is being requested and the data that should be processed. The call can include a crypto key and an integrity value for the Secure Object in the first embodiment illustrated in FIG. 5. The call can include a Secure Object ID in the second embodiment illustrated in FIG. 6. The data processing system can be an artificial intelligence system. The second type of processor can be a specialized processor such as a GPU or a TPU, or other specialized processors 512 to 518. Other alternatives or changes can be made in the steps 700 of the systems 500 or 600.

Another Exemplary Hardware Implementation

Figure 8:
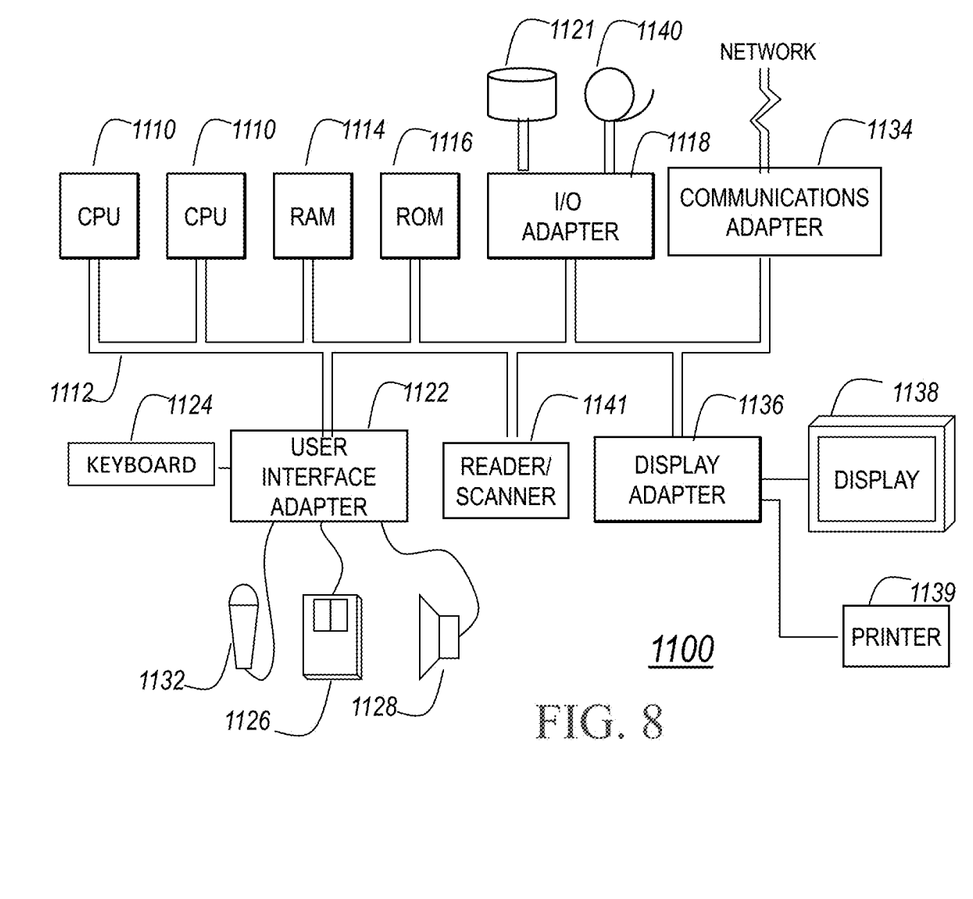
FIG. 8 illustrates an exemplary hardware/information handling system for incorporating the exemplary embodiment of the invention therein.

FIG. 8 illustrates another hardware configuration of an information handling/computer system 1100 in accordance with the invention and which preferably has at least one processor or central processing unit (CPU) 1110 that can implement the techniques of the invention in a form of a software program.

The CPUs 1110 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device to the bus 1112), a communication adapter 1134 for connecting an information handling system to a data processing network, the Internet, an Intranet, a personal area network (PAN), etc., and a display adapter 1136 for connecting the bus 1112 to a display device 1138 and/or printer 1139 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing storage media tangibly embodying a program of machine-readable instructions executable by a digital data processor incorporating the CPU 1110 and hardware above, to perform the method of the invention.

This signal-bearing storage media may include, for example, a RAM contained within the CPU 1110, as represented by the fast-access storage for example.

Alternatively, the instructions may be contained in another signal-bearing storage media 1200, such as a magnetic data storage diskette 1210 or optical storage diskette 1220 (FIG. 9), directly or indirectly accessible by the CPU 1110.

Figure 9:
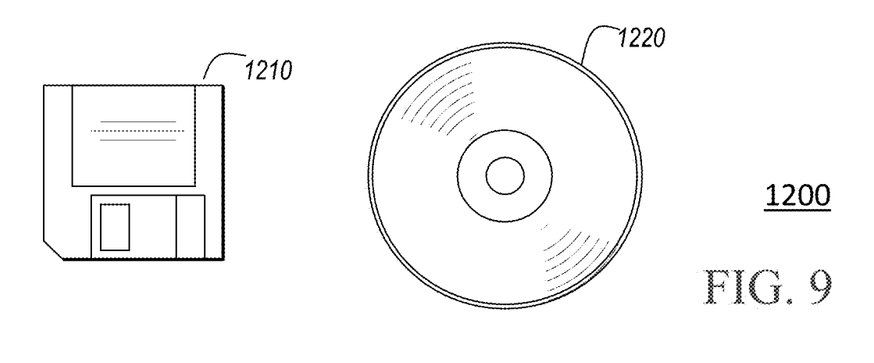
FIG. 9 illustrates a non-transitory signal-bearing storage medium for storing machine-readable instructions of a program that implements the method according to the exemplary embodiment of the invention.

Whether contained in the diskette 1210, the optical disk 1220, the computer/CPU 1110, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing storage media, including memory devices in transmission media, such as communication links and wireless devices, and in various formats, such as digital and analog formats. In an illustrative embodiment of the invention, the machine-readable instructions may comprise software object code.

Therefore, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method for providing support for Secure Objects on a data processing system comprising:
    providing a Secure Object comprising code and data that is protected from another software on the data processing system on a first processor which is a first type of processor, wherein the data processing system has a plurality of processors of different types;
    beginning execution of the Secure Object on the first processor; and
    responsive to a portion of the Secure Object being needed to be executed on a second processor which is a second type of processor, by the first processor calling the second processor in a special interprocessor call to allow access of protected information by the second processor from the first processor and returning information by the second processor to the first processor;
    wherein the Secure Object is protected from the other software on the data processing system when the Secure Object is executing on the first processor and when the Secure Object is executing on the second processor that is a different type than the first processor in a heterogeneous system,
    in which the special interprocessor call passes a crypto key and an integrity value from the first processor to the second processor which the second processor uses to access a cryptographically protected region in system memory.

2. The method according to claim 1, in which the special call passes a crypto key and an integrity value from the first processor to the second processor which the second processor uses to access a cryptographically protected region in system memory,
    wherein the Secure Object comprising code and data begins execution on the first type of processor and makes a call to and continues execution on the second type of processor,
    wherein the first processor which is the first type of processor is different than the second processor which is the second type of processor, and
    wherein the second processor securely processes the information passed and protects the information from other processing on the data processing system.

3. The method according to claim 1, in which the special call passes a Secure Object ID from the first processor to the second processor which the second processor uses to access a protected region in system memory,
    wherein the Secure Object is protected on each of the different processors including the first processor and the second processor, and
    further comprising retrieving, by the first processor, information returned by the second processor from system memory.

4. The method according to claim 2, wherein the second processor performs the processing requested in the special call, storing encrypted information resulting from the processing in system memory.

5. The method according to claim 2, wherein the second processor returns an integrity value for the Secure Object to the first processor.

6. The method according to claim 1, wherein the special call includes an indication of the particular processor that is being called, an indication of the specific function that is being requested and the data that should be processed, and
    wherein different portions of a Secure Object are configured to run on different types of processors from among the plurality of processors of different types.

7. The method according to claim 1, wherein the data processing system is an artificial intelligence system, and
    wherein responsive to the portion of the Secure Object being needed to be executed on the first processor which is the first type of processor, by the second processor calling the first processor in the special interprocessor call to allow access of protected information by the first processor from the second processor and returning information by the first processor to the second processor.

8. The method according to claim 1, wherein the second type of processor is one of a Central Processing Unit, a Graphical Processing Unit, a Tensor Processing Unit, a Field Programmable Gate Array, an Artificial Neural Network, a Quantum Processor and a Cryptographic Processor.

9. The method according to claim 1, wherein the second type of processor is a specialized processor and the first type of processor is a CPU (Central Processing Unit), and
    in which the special call passes a crypto key and an integrity value from the first processor to the second processor which the second processor uses to access a cryptographically protected region in system memory,
    wherein the Secure Object comprising code and data begins execution on the first type of processor and makes a call to and continues execution on the second type of processor,
    wherein the first processor which is the first type of processor is different than the second processor which is the second type of processor, and
    wherein the second processor securely processes the information passed and protects the information from other processing on the data processing system.

10. A computer readable medium, storing a method for securing a Secure Object on a data processing system comprising:
    providing a Secure Object comprising code and data that is protected from another software on the data processing system on a first processor which is a first type of processor, wherein the data processing system has a plurality of processors of different types;
    beginning execution of the Secure Object on the first processor,
    responsive to a portion of the Secure Object being needed to be executed on a second processor which is a second type of processor, by the first processor calling the second processor in a special interprocessor call, the second processor securely processing the information passed and protecting the information from other processing on the data processing system; and
    returning information by the second processor to the first processor;
    wherein the Secure Object is protected from the other software on the data processing system when the Secure Object is executing on the first processor and when the Secure Object is executing on the second processor,
    in which the special interprocessor call passes a crypto key and an integrity value from the first processor to the second processor which the second processor uses to access a cryptographically protected region in system memory.

11. The computer readable medium according to claim 10, in which the special call passes a crypto key and an integrity value from the first processor to the second processor which the second processor uses to access a cryptographically protected region in system memory, and
    wherein the first processor calls the second processor in the special interprocessor call to allow access of protected information by the second processor from the first processor,
    wherein the Secure Object comprising code and data begins execution on the first type of processor and makes a call to and continues execution on the second type of processor, and
    wherein the first processor which is the first type of processor is different than the second processor which is the second type of processor.

12. The computer readable medium according to claim 10, in which the special call passes a Secure Object ID from the first processor to the second processor which the second processor uses to access a protected region in system memory,
    further comprising retrieving, by the first processor, information returned by the second processor.

13. The computer readable medium according to claim 11, wherein the second processor performs the processing requested in the special call, storing encrypted information resulting from the processing in system memory.

14. The computer readable medium according to claim 11, wherein the second processor returns an integrity value to the first processor.

15. The computer readable medium according to claim 10, wherein the special call includes an indication of the particular processor that is being called, an indication of the specific function that is being requested and the data that should be processed.

16. The computer readable medium according to claim 10, wherein the data processing system is an artificial intelligence system, and
  wherein responsive to the portion of the Secure Object being needed to be executed on the first processor which is the first type of processor, by the second processor calling the first processor in the special interprocessor call to allow access of protected information by the first processor from the second processor and returning information by the first processor to the second processor.

17. The computer readable medium according to claim 10, wherein the second type of processor is one of Central Processing Unit, a Graphical Processing Unit, a Tensor Processing Unit, a Field Programmable Gate Array, an Artificial Neural Network, a Quantum Processor and a Cryptographic Processor.

18. The computer readable medium according to claim 10,
  wherein the second type of processor is a specialized processor and the first type of processor is a CPU (Central Processing Unit) in a heterogeneous system,
  wherein the computer readable medium includes a non-transitory computer readable medium, and
  wherein the first processor and the second processor process the Secure Object to protect security of applications that run on the heterogeneous system.

19. A Secure Objects apparatus providing support for Secure Objects that are protected from another software on a heterogeneous data processing system, the Secure Objects apparatus comprising:
  a plurality of different types of processors including at least a first hardware processor and a second hardware processor, wherein different portions of a Secure Object run securely on different types of processors,
  wherein the Secure Object begins execution on a first hardware processor then, depending on application requirements, the Secure Object makes a call to a second hardware processor passing information to the second hardware processor using a predetermined inter-processor function call, the second hardware processor securely processing the information passed and protecting the information from other processing on the data processing system,
  wherein the second hardware processor performs the requested processing and then performs an inter-processor function return, returning values to the Secure Object on the first hardware processor, and
  wherein the Secure Object is protected from the other software on the data processing system when the Secure Object is executing on the first processor and when the Secure Object is executing on the second processor,
  wherein a special interprocessor call passes a crypto key and an integrity value from the first processor to the second processor which the second processor uses to access a cryptographically protected region in system memory.

20. A Secure Objects apparatus according to claim 19, further comprising a system memory accessible by the plurality of processors,
  wherein the system memory includes unprotected memory and cryptographically-protected system memory,
  wherein a Secure Object's private information is cryptographically protected in the cryptographically-protected memory and the private information is available only in unencrypted form to a processor that has the Secure Object's crypto key,
  wherein the Secure Object utilizes unprotected memory for communications buffers to communicate with other entities,
  wherein the first processor calls the second processor in the special interprocessor call to allow access of protected information by the second processor from the first processor,
  wherein when the Secure Object comprising code and data begins execution on the first type of processor and makes a call to and continues execution on the second type of processor, and
  wherein the first processor which is the first type of processor is different than the second processor which is the second type of processor, and
  wherein responsive to the portion of the Secure Object being needed to be executed on the first processor which is the first type of processor, by the second processor calling the first processor in the special interprocessor call to allow access of protected information by the first processor from the second processor and returning information by the first processor to the second processor.

* * * * *